United States Patent [19]

Bederke et al.

[11] Patent Number: 5,473,032
[45] Date of Patent: Dec. 5, 1995

[54] COATING COMPOSITION AND THE USE THEREOF IN PROCESSES FOR PRODUCING MULTI-LAYER COATINGS

[75] Inventors: Klaus Bederke, Sprockhövel; Hermann Kerber, Wuppertal; Olaf Ley, Wuppertal; Michael Prescher, Wuppertal; Petra Köchert-Mühlenbeck, Wuppertal, all of Germany

[73] Assignee: Herberts Gesellschaft mit beschrankter Haftung, Germany

[21] Appl. No.: 66,540

[22] Filed: May 24, 1993

[30] Foreign Application Priority Data

Jun. 2, 1992 [DE] Germany ............... 42 18 106.2

[51] Int. Cl.$^6$ .................... C08F 218/02; C08K 5/105
[52] U.S. Cl. ............... 526/307.7; 526/305; 526/307.5; 526/307.6; 526/313; 524/555; 524/556; 524/559; 524/901; 524/923; 525/450; 523/523
[58] Field of Search ............ 524/555, 556, 524/559, 901, 923; 523/523; 525/450; 526/307.5, 307.6, 307.7, 305, 313

[56] References Cited

U.S. PATENT DOCUMENTS

| Patent No. | Date | Inventor | Class |
|---|---|---|---|
| 3,409,589 | 11/1968 | Kine | 526/307.5 |
| 4,415,697 | 11/1983 | Peng et al. | 525/450 |
| 4,459,379 | 7/1984 | Schwarz | 523/523 |
| 4,616,058 | 10/1986 | Yabuta et al. | 524/461 |
| 4,777,199 | 10/1988 | Ishii et al. | 524/923 |
| 4,855,342 | 8/1989 | Becker et al. | 524/31 |
| 4,865,705 | 9/1989 | Hendrikx et al. | 524/901 |

*Primary Examiner*—Paul R. Michl
*Assistant Examiner*—Olga Asinovsky
*Attorney, Agent, or Firm*—Merchant Gould Smith Edell Welter & Schmidt

[57] ABSTRACT

Coating composition containing one or several (meth-)acrylic copolymers having hydroxyl groups, as well as one or several solvents and, optionally, water, special-effect pigments and/or coloring pigments, fillers and/or conventional lacquering additives, whereby the (meth)acrylic copolymer is essentially constructed from units based on the following monomers:

a) 0.5–10.0% by weight of amides and/or N-substituted amides of acrylic acid and/or methacrylic acid,
b) 5.0–30.0% by weight of phenylalkyl esters of acrylic acid and/or methacrylic acid,
c) 10.0–30.0% by weight of hydroxyalkyl esters of acrylic acid and/or methacrylic acid having 2–8 C-atoms in the hydroxyalkyl residue,
d) 0.6–7.5% by weight of acrylic acid and/or methacrylic acid, and
e) 30.0–83.9% by weight of alkyl esters of acrylic acid and/or methacrylic acid having 1–18 C-atoms in the alkyl residue, and whereby the sum of components a) to e) amounts in each case to 100. The coating compositions are particularly suitable for producing layers of base lacquer in multi-layer lacquer coatings, in particular for series and repair lacquering in the motor-vehicle industry.

11 Claims, No Drawings

COATING COMPOSITION AND THE USE THEREOF IN PROCESSES FOR PRODUCING MULTI-LAYER COATINGS

The invention relates to a coating composition which is particularly suitable for the creation of a basecoat intended to find application in the production of multi-layer coatings which are capable of being cured. Coatings produced therefrom exhibit improved resistance to solvent after being overlacquered with clear lacquers. The invention also relates to processes for producing multi-layer coatings which make use of the coating composition according to the invention, as well as the use of the coating composition for this purpose.

Coating compositions for producing finishes with a metallic effect are well-known. Such a coating composition is described in EP-A 0 289 997. It contains binding agents based on (meth)acrylic copolymers of (meth)acrylamides, reaction products of glycidyl (meth)acrylate with aromatic monocarboxylic and dicarboxylic acids, hydroxyalkyl esters of (meth)acrylic acid and copolymerisable α,β-olefinically unsaturated compounds.

The aim of the invention is the provision of coating compositions which are particularly suitable as basecoats in multi-layer lacquer coatings and which exhibit improved resistance to solvent after being overlacquered with clear lacquers.

It has been shown that this aim can be achieved with a coating composition representing one object of the invention, said coating composition containing one or several (meth)acrylic copolymers having hydroxyl groups, optionally low-viscosity cellulose acetobutyrate, crosslinking agents, one or several solvents, as well as, optionally, special-effect pigments and/or colouring pigments, fillers and/or conventional lacquering additives, and which is characterised in that it contains by way of binding agent a (meth)acrylic copolymer which is essentially constructed from the following monomers:

a) 0.5–10.0% by weight of amides and/or N-substituted amides of acrylic acid and/or methacrylic acid, b) 5.0–30.0% by weight of phenylalkyl esters of acrylic acid and/or methacrylic acid, c) 10.0–30.0% by weight of hydroxyalkyl esters of acrylic acid and/or methacrylic acid having 2–8 C-atoms in the hydroxyalkyl residue, d) 0.6–7.5% by weight of acrylic acid and/or methacrylic acid, and e) 30.0–83.9% by weight of alkyl esters of acrylic acid or methacrylic acid having 1–18 C-atoms in the alkyl residue, whereby the sum of components a) to e) amounts in each case to 100.

The above component a) is preferably present in the (meth)acrylic copolymer used in accordance with the invention in a quantity ranging from 0.5 to 5.0% by weight. A preferred quantity of component b) is around 5 to 15% by weight. The quantity of component c) is preferably around 15 to 23% by weight; the quantity of component d) is preferably around 1.2 to 6.0% by weight and the quantity of component e) preferably around 50 to 70% by weight.

It has been shown that with the coating composition according to the invention it is possible to produce multi-layer coatings by wet-on-wet application, whereby in particular the coating composition containing special-effect pigment can be applied to substrates which have optionally been primed and merely needs to be overlacquered with a clear lacquer. The coating composition according to the invention can be applied with a high content of processing solids, which may have an order of magnitude of 20 to 40% by weight. This results in a great advantage with respect to the amount of solvent required hitherto; for example, it has only been possible to apply the coating compositions used in accordance with the state of the art as described above with a solids content of 9–16% by weight. Considerable advantages therefore result as regards savings of solvent and also the associated reduction in environmental pollution. Furthermore, the coating compositions according to the invention can be formulated on an aqueous basis, so that to a great extent, for example up to 90% by weight, organic solvents can be replaced by water.

It has been shown that these advantages can be achieved with the make-up of the (meth)acrylic copolymer containing hydroxyl groups in the coating composition according to the invention.

The copolymer contained in the coating composition according to the invention can be produced by polymerisation in accordance with conventional processes—e.g., bulk, solution or bead polymerisation. The various polymerisation processes are well-known and are described in: Houben-Weyl, Methoden der Organischen Chemie, 4th Edition, Volume 14/1, pages 24–255 (1961).

The solution-polymerisation process is preferred for the production of the copolymer used in accordance with the invention. With this process the solvent is transferred into the reaction vessel, heated to boiling-point, and the monomer/initiator mixture is charged continuously within a definite time.

Polymerisation is carried out, for example, at temperatures between 60° C. and 160° C., preferably at 80° C. to 140° C. The polymerisation reaction can be started with known polymerisation initiators. Suitable initiators are, e.g., per and azo compounds which dissociate thermally into radicals in a first-order reaction. The type and amount of initiator are chosen in such a way that the supply of radicals is as constant as possible at the polymerisation temperature during the feed phase.

Examples of initiators which are preferably used for polymerisation are: dialkyl peroxides, such as di-tert.-butyl peroxide, dicumyl peroxide; diacyl peroxides, such as dibenzoyl peroxide, dilauroyl peroxide; hydroperoxides, such as cumene hydroperoxide, tert.-butyl hydroperoxide; peresters, such as tert.-butylperbenzoate, tert.-butylperpivalate, tert.-butyl-per-3,5,5-trimethylhexanoate, tert.-butyl-per-2-ethylhexanoate; peroxydicarbonates, such as di-2-ethylhexyl peroxydicarbonate, dicyclohexyl peroxydicarbonate; perketals, such as 1,1-bis-(tert.-butylperoxy)-3,5,5-trimethylcyclohexane, 1,1-bis-(tert.-butylperoxy)cyclohexane; ketone peroxides, such as cyclohexanone peroxide, methylisobutylketone peroxide; azo compounds, such as 2,2'-azo-bis(2,4-dimethylvaleronitrile), 2,2'-azo-bis(2-methylbutyronitrile), 1,1'-azo-bis-cyclohexanecarbonitrile, azo-bis-isobutyronitrile.

The polymerisation initiators, in particular the peresters, can be used in a quantity from 0.2 to 5% by weight in relation to the weighed sample of monomer.

Suitable as organic solvents which can be used appropriately in solution polymerisation, and also later in the coating compositions according to the invention, are, for example: glycol ethers, such as ethylene glycol dimethylether; esters of glycol ether, such as butylglycol acetate, 3-methoxy-n-butyl acetate, butyldiglycol acetate, methoxypropyl acetate; esters, such as butyl acetate, isobutyl acetate, amyl acetate; ketones, such as methylethylketone, methylisobutylketone; alcohols, such as ethanol, n-propanol, isopropanol, n-butanol, isobutanol, sec.-butanol, tert.-butanol, hexanol, 2-ethylhexanol; aromatic hydrocarbons, such as xylene, Solvesso 100 (registered trade mark), as well as mixtures thereof, and aliphatic hydrocarbons can also be used in a blend together with the above-mentioned solvents.

In order to regulate the molecular weight, use can be made concomitantly, particularly in the case of the preferred solution polymerisation, of conventional chain-transfer agents. Examples are mercaptans, thioglycollic acid esters, chlorinated hydrocarbons, cumene, dimeric α-methylstyrene.

The polymerisation conditions (reaction temperature, feed time of the monomer mixture, solution concentration) are chosen in such a way that the (meth)acrylic copolymers produced according to the invention have a number average molecular weight (determined by gel permeation chromatography using polystyrene as calibrating substance) between 5000 and 30,000.

The (meth)acrylic copolymers produced according to the invention lie within a glass transition temperature range of −10° C. to +80° C., calculated from the glass transition temperature of the homopolymers of the individual monomers as given in the literature (FOX equation—cf, e.g., Polymere Werkstoffe, Batzer, 1985, page 307).

The expression '(meth)acrylic' used in the present specification and in the claims signifies acrylic and/or methacrylic. By way of monomer component a) use may be made, for example, of the following compounds: acrylamide, methacrylamide and N-substituted (meth)acrylamides. Examples of N-substituted (meth)acrylamides are: N-methyl amide, N-ethyl amide, N-n-propyl amide, N-isopropyl amide, N-n-butyl acrylamide, N-tert.-hexyl acrylamide, N-tert.-octyl acrylamide, N-(1-methylundecyl) acrylamide, N-isobornyl acrylamide, N-benzyl acrylamide, N-norbornyl acrylamide, N-(1,1,3)-trimethyl)butyl acrylamide, N-cyclohexyl acrylamide, N-methyl methacrylamide, N-(1,1-dimethyl-3-oxobutyl)acrylamide, N-tert.-butyl methacrylamide, N-decyl acrylamide, N-cyclohexyl methacrylamide and/or N-benzyl methacrylamide, whereby N-tert.-butyl acrylamide and N-tert.-butyl methacrylamide are preferred.

By way of examples of monomer component b) use can be made of phenylalkyl acrylates and phenylalkyl methacrylates: phenylmethyl acrylate, phenylethyl acrylate, 3-phenyl-n-propyl acrylate, 4-phenyl-n-butyl acrylate, 3-phenyl-1-propyl acrylate, 3-phenyl-2-methylpropyl acrylate, phenylethyloxyethyl acrylate, phenylmethyl methacrylate, phenylethyl methacrylate, 3-phenyl-n-propyl methacrylate, 4-phenyl-n-butyl methacrylate, 3-phenyl-1-propyl methacrylate, 3-phenyl-2-methylpropyl methacrylate and/or phenylethyloxyethyl methacrylate, whereby use is made preferably of 3-phenylpropyl methacrylate.

Examples of monomer component c) are hydroxyalkyl esters of acrylic acid or methacrylic acid: β-hydroxyethyl acrylate, β-hydroxyethyl methacrylate, β-hydroxypropyl acrylate, β-hydroxypropyl methacrylate, butanediol-1,4-monoacrylate, butanediol-1,4-monomethacrylate, hexanediol-1,6-monoacrylate and/or hexanediol-1,6-monomethacrylate. Use can also be made, at least partly, of polyalkylene oxide mono(meth)acrylates having 2 to 10 units of alkylene oxide per molecule.

In addition, use can be made of reaction products of one mole hydroxyalkyl (meth)acrylate with, on average, two moles ε-caprolactone.

As a result of the use of component c), hydroxyl groups are introduced into the copolymer. The quantity of component c) is chosen in such a way as to result in a hydroxyl number from 50 to 120 mg KOH/g and, particularly preferred, from 70 to 90 mg KOH/g.

With a view to providing the (meth)acrylic copolymer with carboxyl groups, acrylic acid and/or methacrylic acid are incorporated by polymerisation in such amounts as to yield an acid number of 5 to 50 mg KOH/g (monomer component d)). In this connection the acid number for systems containing solvent preferably has a magnitude of 5 to 30 mg KOH/g, and for aqueous systems preferably around 30 to 50 mg KOH/g.

By way of alkyl esters of acrylic acid or methacrylic acid (monomer component e)), use is made, for example, of: methyl acrylate, methyl methacrylate, ethyl acrylate, ethyl methacrylate, isopropyl methacrylate, tert.-butyl acrylate, n-butyl acrylate, n-butyl methacrylate, isobutyl acrylate, isobutyl methacrylate, cyclohexyl methacrylate, trimethylcyclohexyl methacrylate, 2-ethylhexyl acrylate, 2-ethylhexyl methacrylate, lauryl acrylate, lauryl methacrylate, stearyl acrylate, stearyl methacrylate, isobornyl acrylate and/or isobornyl methacrylate.

By way of monomer component e) use can also be made concomitantly of difunctional and polyfunctional (meth)acrylates in a quantity from 1 to 10% by weight. Copolymerisation of such monomers with monofunctional (meth)acrylates results in polymers which have a certain degree of branching. By way of monomer having two or three (meth) acryloyl functions per mole, use may be made, for example, of: butanediol-1,4-di(meth)acrylate, butanediol-1,3-di(meth)acrylate, hexanediol-1,6-di(meth)acrylate, dipropylene glycol di(meth)acrylate, ethylene glycol di(meth)acrylate, neopentyl glycol di(meth)acrylate, tetraethylene glycol di(meth)acrylate, trimethylol propane tri(meth)acrylate, pentaerythritol tri(meth)acrylate and/or pentaerythritol tetra(meth)acrylate.

The types of cellulose acetobutyrate used here are characterised in particular by a butyryl content of 25 to 40% by weight, preferably 28 to 33% by weight, and an acetyl content of 10 to 25% by weight, preferably 16 to 21% by weight. In a 20% solution in acetone and ethyl alcohol (72:8) they have a viscosity of 18 to 57 mPa.s, determined at 25° C. (Formula A ASTM: method D 817).

The coating compositions according to the invention can be formulated as self-drying coating compositions without the addition of crosslinking agents. They are then particularly suitable as repair coatings which do not need high stoving temperatures.

It is also possible, however, to combine the (meth)acrylic copolymers used in accordance with the invention optionally with crosslinking agents such as amino resin, free or blocked polyisocyanates or prepolyisocyanates, in particular so as to produce thermosetting layers of base lacquer.

Suitable amino resins include, for example, alkylated condensates produced by reaction of aminotriazines and amidotriazines with aldehydes. According to known technical processes, compounds bearing amino or amido groups, such as melamine, benzoguanamine, dicyandiamide, urea, N,N'-ethylene-urea, are condensed in the presence of alcohols, such as methyl, ethyl, propyl, isobutyl, n-butyl and hexyl alcohol, with aldehydes, in particular formaldehyde. The reactivity of such amine resins is determined by the degree of condensation, by the ratio of the amine or amide component to the formaldehyde and by the type of the etherification alcohol employed. The relative proportion of (meth)acrylic copolymer used in accordance with the invention to amino resin amounts to 80:20 to 60:40 (reckoned as solids).

The proportion of polyisocyanate crosslinking agent is chosen in such a way that 0.5 to 1.5 isocyanate groups are allotted to a hydroxyl group of the (meth)acrylic copolymer.

Excess isocyanate groups may react off as a consequence of moisture and contribute to crosslinking. Use may be made, for example, of aliphatic, cycloaliphatic and aromatic polyisocyanates, such as hexamethylene diisocyanate, trimethylhexamethylene diisocyanate, isophorone diisocyanate, 4,4'-diisocyanatodicyclohexylmethane, toluylene-2,4-diisocyanate, o-, m- and p-xylylene diisocyanate, 4,4'-diisocyanatodiphenylmethane; polyisocyanates masked with CH-, NH- or OH-acidic compounds; polyisocyanates containing biuret allophanate, urethane and/or isocyanurate groups.

Examples of such polyisocyanates are a reaction product of 3 moles hexamethylene diisocyanate with 1 mole water, said product containing biuret groups and having an NCO content of about 22% (corresponding to the commercial product Desmodur N® made by BAYER AG); a polyisocyanate containing isocyanurate groups which is produced by trimerising 3 moles hexamethylene diisocyanate having an NCO content of around 21.5% (corresponding to the commercial product Desmodur N 3390® made by BAYER AG); or polyisocyanate containing urethane groups which represent reaction products of 3 moles toluylene diisocyanate and 1 mole trimethylol propane with an NCO content of about 17.5% (corresponding to the commercial product Desmodur L® made by BAYER AG). Use is preferably made of Desmodur N® and Desmodur N 3390®.

The basecoats which contain the (meth)acrylic copolymer to be used in accordance with the invention may contain, in addition to the solvents already named, conventional lacquering additives such as auxiliary materials—e.g., flow-control agents based on (meth)acrylic homopolymers, silicon oils, softeners such as esters of phosphoric, phthalic or citric acid, anti-settling agents, such as montmorillonite, pyrogenic silicon oxide, hydrated castor oil; wetting agents, such as copolymers of high molecular weight having amino groups (e.g., the commercial products Disperbyk 160® and 104 S) or polyamine-polyester condensation products (e.g., Solsperse 24000®); accelerators for the reaction of the (meth)acrylic copolymer according to the invention with amino resins or polyisocyanate resins, amino resins as agents for improving the spray-on characteristics and pigment wetting; phosphoric acid, phosphoric acid esters, dicarboxylic acid half-esters, citric acid, organic metallic salts such as dibutyltin dilaurate, zinc naphthenate, also compounds containing tertiary amino groups, such as triethylamine.

For the production of the basecoats which contain the (meth)acrylic copolymer according to the invention, use may be made of pigments and fillers. Use may be made of transparent or opaque inorganic and/or organic colouring pigments which are customary in lacquering. In order to achieve brilliant polychromatic metallic effects, use is made of metallic pigments, for example aluminium pigments— e.g., those produced from high-purity aluminium (99.99%) and/or pearlescent pigments, optionally with transparent inorganic and/or organic pigments.

The coating compositions according to the invention have the advantage that they result in coatings which have particularly good resistance to solvent after further application of layers of clear lacquer and topcoat lacquer. This makes them more suitable for achieving metallic finishes, since the orientation of special-effect pigments such as metallic pigments is excellent. The improved compatibility of the coating compositions according to the invention with cellulose acetobutyrate (CAB) of various types, which can be admixed to the coating compositions without any trouble, also contributes in this respect.

The coating compositions according to the invention are particularly suitable for creating a layer of base lacquer in the production of air-drying and stove-drying multi-layer coatings. They can be applied to substrates which have, for example, been coated in advance with base materials such as primers and/or fillers. They are particularly suitable for series and repair lacquering of motor-vehicle bodies and parts thereof. They have the advantage that they can be applied with a high content of processing solids. The layer of topcoat or clear lacquer which can be produced from conventional coating compositions, such as thermoplastic clear lacquers containing aminoplastic or polyisocyanate, can be applied by the wet-on-wet process, optionally after firstly bringing about evaporation, whereupon both layers are dried or cured jointly. The invention therefore also relates to the process for producing a multi-layer coating composition or the use of the coating compositions for producing basecoats for multi-layer coatings which dry under room conditions or which are capable of being cured chemically.

The following Examples serve to elucidate the invention. All parts refer to weight.

EXAMPLES 1 to 5

Production of the (Meth)Acrylic Copolymer

Formulation I (quantities given in Table 1) is introduced into a 2-liter three-necked flask with ground-glass stopper, said flask being equipped with stirring unit, contact thermometer, ball condenser and dropping funnel, and heated to 125° C. with stirring and with a reflux condenser connected. Within 5 hours Formulation II (monomer mixture+initiator) is continuously charged from the dropping funnel. After the feeding is over, the dropping funnel is rinsed out with Formulation III and added to the reaction material. Subsequently the sediment is post-polymerised for 3 hours at 124°–125° C. until the reaction is complete.

TABLE 1

| | | | (weighed sample in grams) | | | | |
|---|---|---|---|---|---|---|---|
| | | | | Examples: | | | |
| Formulation: | Constituent: | Component: | 1 | 2 | 3 | 4 | 5 |
| I | butyl acetate | | 400.0 | 400.0 | 400.0 | 400.0 | — |
| | butyl glycol | | — | — | — | — | 400.0 |
| II | N-tert.-butyl acrylamide | a) | 40.0 | 40.0 | 40.0 | 40.0 | 40.0 |
| | phenylpropyl methacrylate | b) | 48.0 | 48.0 | 48.0 | 48.0 | 48.0 |
| | hydroxyethyl methacrylate | c) | 52.0 | — | — | 48.0 | 48.0 |
| | hydroxypropyl acrylate | c) | 52.0 | 104.0 | 52.0 | 47.0 | 47.0 |
| | hydroxypropyl methacrylate | c) | — | — | 59.0 | — | — |

TABLE 1-continued (weighed sample in grams)

| Formulation: | Constituent: | Component: | Examples: 1 | 2 | 3 | 4 | 5 |
|---|---|---|---|---|---|---|---|
| | acrylic acid | d) | 5.5 | 5.5 | 5.5 | 5.0 | 26.0 |
| | methyl methacrylate | e) | 171.0 | 171.0 | 168.0 | 145.0 | 145.0 |
| | butyl acrylate | e) | 178.0 | 178.0 | 174.0 | 140.0 | 146.0 |
| | butanediol-1,4-diacrylate | e) | — | — | — | 20.0 | — |
| | tert.-butylperoxybenzoate | | 3.5 | 3.5 | 3.5 | 10.0 | 3.0 |
| III | n-butanol | | 50.0 | 50.0 | 50.0 | 97.0 | — |
| | butyl glycol | | — | — | — | — | 97.0 |
| | | | 1000.0 | 1000.0 | 1000.0 | 1000.0 | 1000.0 |
| | characteristic data: | | | | | | |
| | solids (%): | | 55.2 | 55.3 | 55.4 | 50.6 | 51.2 |
| | viscosity (mPa · s at 25° C.): | | 1515 | 1100 | 1580 | 2020 | 1400 |
| | acid number (rel. to solid resin): | | 9.8 | 10.6 | 9.5 | 10.4 | 42.0 |

The concentration of the solution of copolymer obtained according to Example 5 is raised to about 75% at 120° C. by distillation in a vacuum and the solution is cooled to 60° C. Then 55% of the carboxyl groups are neutralised with dimethylethanol amine. After this, dilution is effected with de-ionised water to a solids content of about 25%. A dispersion resulted having a viscosity of 250 mPa.s at 25° C.

The CAB (cellulose acetobutyrate) used in the following lacquering examples has a butyryl content of 31.2% by weight, an acetyl content of 18.5% by weight and an OH content of 1.3% by weight.

Production of Base Lacquers

Base Lacquer Example 1—Metallic Silver

To 24.5 parts of the solution of binding agent according to the invention as outlined in Examples 1, 2 and 3 there are added 10 parts of a thickener paste which is produced from 42.7 parts of the solution of binding agent described above, into which 43.1 parts of an 8.7% montmorillonite paste—solubilised in 5 parts ethanol and 86.3 parts xylene—and 2.6 parts of a highly dispersed silicon dioxide are stirred in and following dispersion are supplemented on a pearl mill by 8.3 parts of the solution of binding agent described above and 3.3 parts butyl acetate. To this mixture there are added 1.3 parts of a commercial wetting and dispersing agent based on polycarboxylic acid of high molecular weight (commercial product Disperbyk 104 S), silicone resin 50% in xylene and 30 parts of a 30% solution of a commercial CAB of low viscosity dissolved in butyl acetate.

In a separate vessel there are placed 6 parts of a commercial non-leafing aluminium paste, solubilised with 7 parts butyl acetate and stirred into the mixture described above. In order to adjust the viscosity, 21.2 parts butyl acetate are added.

After adjustment to spray viscosity with a mixture of butyl acetate, test benzine K21 and xylene in a ratio of 3:2:1 to 22 S DIN 4 mm the resulting solids content (1 h 130° C.) in the case of the metallic-silver base lacquer is 20.3%.

Test benzine K21: aliphatic hydrocarbons (boiling-range 130°–170° C.).

Base Lacquer Example 2—Coloured Metallic, Blue 80 parts of the metallic-silver base lacquer described in base lacquer Example 1 are mixed with 20 parts of a blue-pigmented mixed lacquer which is produced by mixing, subject to stirring, 43.5 parts of a solution of binding agent described in the claim according to Example 1, 2 or 3 with 47.4 parts of a blue pigment paste consisting of 5 parts of a commercial phthalocyanine blue and 0.2 parts of a highly dispersed silicon dioxide, which are stirred together into a mixture consisting of 14.2 parts of a commercial polyacrylic resin containing OH groups which is capable of being crosslinked by amine resin and which is CAB-compatible, dissolved 55% in xylene, 10 parts of a 15% solution of a commercial CAB of low viscosity dissolved in butyl acetate, 3 parts of an 8.7% montmorillonite paste which has been solubilised in 5 parts ethanol and 86.3 parts xylene, and 1.2 parts of a commercial wetting and dispersing agent based on polycarboxylic acid of high molecular weight and silicone resin 50% in xylene. After intensive stirring this blue pigment paste is diluted with 6.8 parts butyl acetate and 7 parts butylglycol acetate and dispersed on a pearl mill to a fineness of grinding of <10 μm. Then the mixed lacquer is adjusted with 9.1 parts butyl acetate and xylene in a 1:1 mixture to storage viscosity.

After adjustment to spray viscosity with a mixture of butyl acetate, test benzine K21 and xylene in a ratio of 3:2:1 to 22 S DIN 4 mm the resulting solids content (1 h 130° C.) in the case of this blue metallic base lacquer is 21.4%.

Base Lacquer Example 3—Uni-2 Layer, White 26.7 parts of a solution of binding agent described in the Claim according to Example 1, 2 or 3 are diluted with 2 parts butyl acetate. Subject to stirring, 69.3 parts of a white pigment paste are added, said paste being produced from 19 parts titanium dioxide and 0.25 parts of highly dispersed silicon dioxide, which are stirred together into a mixture consisting of 14 parts of a commercial polyacrylic resin containing OH groups, which is capable of being crosslinked by amine resin and which is CAB-compatible, dissolved 55% in xylene, 21.85 parts of a 15% solution of a commercial CAB of low viscosity, dissolved in butyl acetate, 3.8 parts of an 8.7% montmorillonite paste which has been solubilised in 5 parts ethanol and 86.3 parts xylene, and 1.2 parts of a commercial wetting and dispersing agent based on polycarboxylic acid of high molecular weight and silicone resin 50% in xylene. After intensive stirring this white paste is diluted with 9.2 parts butylglycol acetate and dispersed on a pearl mill to a fineness of grinding of <12 μm. In order to adjust the viscosity, 2 parts butyl acetate are added.

After adjustment to spray viscosity with a mixture of butyl acetate, test benzine K21 and xylene in a ratio of 3:2:1 to 22 S DIN 4 mm the resulting solids content (1 h 130° C.) in the case of this white uni base lacquer is 30.2%.

Base Lacquer Example 4—Crosslinked with Isocyanate

To a sample according to base lacquer Example 3, uni-2 layer, white, there are added 20% of a solution of 43.4 parts of an aliphatic polyisocyanate—90% in butyl acetate/mixture of higher-boiling aromates 1:1—diluted in 56.44 parts of a mixture of butyl acetate and butylglycol acetate 1:1, and 0.16 parts of a 10% solution of butyltin dilaurate dissolved in xylene.

After adjustment to spray viscosity with a mixture of butyl acetate, test benzine K21 and xylene in a ratio of 3:2:1 to 2 S DIN 4 mm the resulting solids content (1 h 130° C.) in the case of this white uni-2 layer of base lacquer is 35.1%.

Base Lacquer Example 5—Silver with Reactive Component for Stoving Systems 19.5 parts of a solution of binding agent described in the Claim according to Example 1, 2 or 3 are mixed with 5 parts of a commercial, non-plasticised, highly reactive melamine-formaldehyde resin, dissolved 55% in isobutanol/xylene. Stirred into this mixture are 10 parts of a thickener paste which is produced from 42.7 parts of the solution of binding agent described in the Claim, into which 43.1 parts of an 8.7% montmorillonite paste—solubilised in 5 parts ethanol and 86.3 parts xylene—and 2.6 parts of a highly dispersed silicon dioxide and which after dispersion on a pearl mill are supplemented by 8.3 parts of the solution of binding agent described above and 3.3 parts butyl acetate. To this mixture there are added 1.3 parts of a commercial wetting and dispersing agent based on polycarboxylic acid of high molecular weight and silicone resin 50% in xylene and 30 parts of a 30% solution of a commercial CAB of low viscosity, dissolved in butyl acetate.

In a separate vessel there are placed 6 parts of a commercial non-leafing aluminium paste, solubilised with 7 parts butyl acetate and stirred into the mixture previously described. In order to adjust the viscosity, 21.2 parts butyl acetate are added.

After adjustment to spray viscosity with a mixture of butyl acetate, test benzine K21 and xylene in a ratio of 3:2:1 to 22 S DIN 4 mm the resulting solids content (1 h 130° C.) in the case of this metallic-silver base lacquer is 20.1%.

Lacquering Structure of the Bronze Lacquer Examples with a Two-Component Clear Lacquer (Crosslinked with Polyisocyanate)

A filler, preferably a two-component polyurethane filler, is sprayed with a layer thickness of 40–60 µm onto an undercoat based on primer or filler or which has been provided with a coating of old lacquer. Subsequent to drying and grinding, the metallic base lacquers are applied with a layer thickness of 15–25 µm (base lacquer Examples 1, 2, 4, 5) or the uni base lacquer with a layer thickness of 30–45 µm (base lacquer Example 3) in a spray process with a spray pressure of 4–5 bar. In respect of base lacquer Examples 1–4 a transparent topcoat of a polyurethane lacquer based on a hydroxyfunctional polyacrylate resin and an aliphatic polyisocyanate is applied after an airing-time of 10–20 min, the layer thickness being 40–60 µm. Drying of the layer of clear lacquer is effected at room temperature (for at least 16 hours at 25° C.) or with forced drying for more than 40 min at 60° C.

In the case of the base lacquer Example 5 a transparent topcoat based on an OH-functional polyacrylate resin and a melamine resin etherified with n-butanol is applied with a layer thickness of 40–60 µm. After an airing-time of 5–10 min stoving is effected for 30 min at 130° C.

The finishes obtained have an excellent gloss, good mechanical properties and also a high resistance to weathering. Basecoat lacquer Examples 1, 2, 4 and 5 exhibit excellent solvent resistance and metallic effect.

We claim:

1. A coating composition suitable for creating a basecoat for the production of multi-layer coatings, comprising at least one (meth)acrylic copolymer of the following monomers:
   a) 0.5–10.0% by weight of amides and/or N-substituted amides of acrylic acid and/or methacrylic acid,
   b) 5.0–30.0% by weight of phenylalkyl esters of acrylic acid and/or methacrylic acid,
   c) 10.0–30.0% by weight of hydroxyalkyl esters of acrylic acid and/or methacrylic acid having 2–8 C-atoms in the hydroxyalkyl residue,
   d) 0.6–7.5% by weight of acrylic acid and/or methacrylic acid, and
   e) 30.0–83.9% by weight of alkyl esters of acrylic acid and/or methacrylic acid having 1–18 C-atoms in the alkyl residue,
   whereby the sum of components a) to e) amounts in each case to 100.

2. A coating composition according to claim 1, wherein the (meth)acrylic copolymer has a hydroxyl number of 50 to 120 mg KOH/g, an acid number of 5 to 50 mg KOH/g, a weight average molecular weight of 5000 to 30,000 and a glass transition temperature of −10° C. to +80° C.

3. A coating composition according to claim 1, wherein it contains low-viscosity cellulose acetobutyrate.

4. A coating composition according to claim 1, wherein it contains no added crosslinking agents.

5. A coating composition according to claim 1, wherein it additionally contains one or several crosslinking agents.

6. A coating composition according to claim 5, wherein it contains as crosslinking agent one or more polyisocyanates and/or prepolyisocyanates, wherein the isocyanate groups can be free or blocked.

7. A coating composition according to claim 5, wherein it contains one or several amino resins as crosslinking agent.

8. A coating composition according to claim 1, wherein it contains by way of special-effect pigments metal-flake pigments and/or pearlescent pigments as well as, optionally, fillers.

9. A coating composition according to claim 1, wherein it contains metal-flake pigments and colouring pigments, as well as, optionally, fillers.

10. A coating composition according to claim 1 further comprising one or more (meth)acrylic copolymers having hydroxyl groups and one or more solvents.

11. A coating composition according to claim 1 further comprising ingredients selected from group consisting of waters special-effect pigments, coloring pigments, filler, conventional lacquering additives and any combination thereof.

* * * * *